United States Patent
Nagai

(10) Patent No.: US 10,321,015 B2
(45) Date of Patent: Jun. 11, 2019

(54) IMAGE PROCESSING APPARATUS AND IMAGE PROCESSING METHOD

(71) Applicant: CANON KABUSHIKI KAISHA, Tokyo (JP)

(72) Inventor: Jun Nagai, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/001,884

(22) Filed: Jan. 20, 2016

(65) Prior Publication Data

US 2016/0142584 A1    May 19, 2016

Related U.S. Application Data

(63) Continuation of application No. 13/302,638, filed on Nov. 22, 2011, now abandoned.

(30) Foreign Application Priority Data

| Dec. 14, 2010 | (JP) | 2010-278368 |
| Dec. 28, 2010 | (JP) | 2010-293469 |

(51) Int. Cl.
*H04N 1/40* (2006.01)
*H04N 1/387* (2006.01)
*H04N 1/409* (2006.01)

(52) U.S. Cl.
CPC ....... *H04N 1/40093* (2013.01); *H04N 1/3871* (2013.01); *H04N 1/4092* (2013.01)

(58) Field of Classification Search
CPC . H04N 1/40093; H04N 1/3871; H04N 1/4092
USPC ........................................... 358/1.14
See application file for complete search history.

(56) References Cited

U.S. PATENT DOCUMENTS

| 4,204,232 | A  |   | 5/1980 | Mizuno |
| 5,289,293 | A  | * | 2/1994 | Kato .................. H04N 1/40062 358/3.07 |
| 5,712,924 | A  | * | 1/1998 | Fujimoto ................. H04N 1/46 358/512 |
| 5,781,653 | A  |   | 7/1998 | Okubo |
| 5,875,044 | A  | * | 2/1999 | Seto .................... H04N 1/40068 358/445 |
| 6,289,137 | B1 | * | 9/2001 | Sugiyama ............... G06T 5/009 358/451 |
| 6,334,666 | B1 |   | 1/2002 | Inui et al. |

(Continued)

FOREIGN PATENT DOCUMENTS

| JP | 2004314308 A  | 11/2004 |
| JP | 2009-139664 A | 6/2009 |
| JP | 2009-152766 A | 7/2009 |

*Primary Examiner* — Neil R McLean
*Assistant Examiner* — Darryl V Dottin
(74) *Attorney, Agent, or Firm* — Carter, DeLuca & Farrell LLP

(57) ABSTRACT

To detect an image region to be an object of thinning processing appropriately and through the use of simple processing. An image processing apparatus detects a line region being a region sandwiched by white pixel regions and consisting only of a non-white pixel region, and detects a thinning candidate region being a region sandwiched by black pixel regions in the line region. A thinning region is detected from the inside of the thinning candidate region.

8 Claims, 11 Drawing Sheets

(56) References Cited

U.S. PATENT DOCUMENTS

| | | | |
|---|---|---|---|
| 7,298,927 B2* | 11/2007 | Nako | H04N 1/3878 |
| | | | 358/1.2 |
| 7,336,396 B2 | 2/2008 | Takano et al. | |
| 8,014,030 B2 | 9/2011 | Nakahara | |
| 8,427,704 B2 | 4/2013 | Tanaka et al. | |
| 2001/0020949 A1* | 9/2001 | Gong | H04N 1/40062 |
| | | | 345/593 |
| 2003/0007197 A1* | 1/2003 | Kim | H04N 1/00795 |
| | | | 358/497 |
| 2004/0008333 A1* | 1/2004 | Oda | G03G 15/50 |
| | | | 355/55 |
| 2008/0018937 A1* | 1/2008 | Kimakura | H04N 1/4092 |
| | | | 358/3.1 |
| 2008/0144059 A1 | 6/2008 | Nagai | |
| 2009/0027699 A1 | 1/2009 | Nagai | |
| 2012/0147437 A1 | 6/2012 | Nagai | |

\* cited by examiner

INPUT IMAGE DATA

DETERMINATION PROCESSING
WITH 8-DOT UNIT

DETECTION OF
THINNING REGION

EXECUTION OF
THINNING PROCESSING

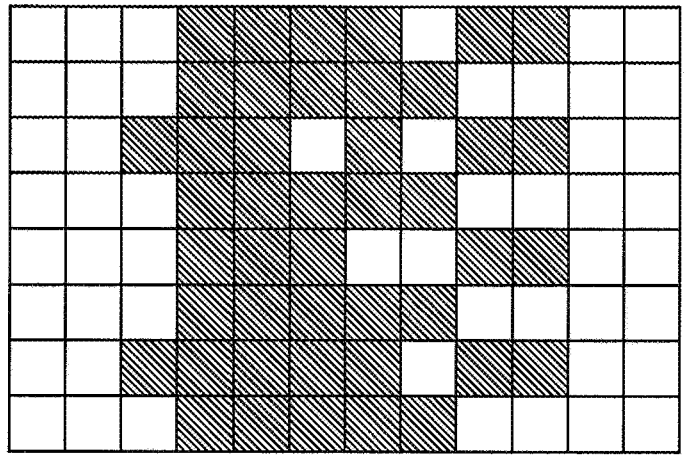
FIG. 6C (PRIOR ART) EXECUTION OF THINNING PROCESSING
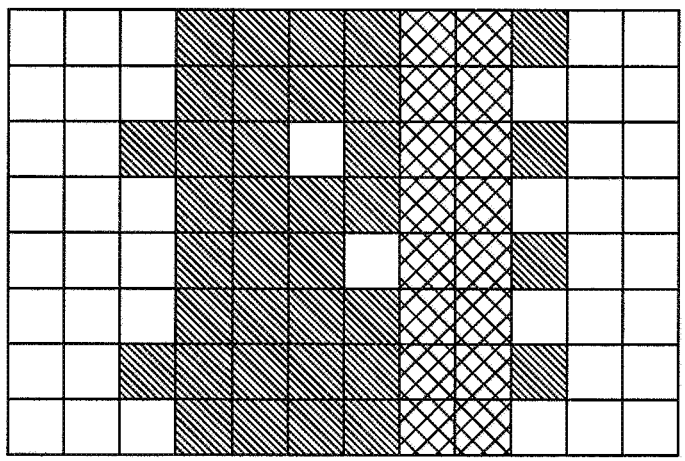
FIG. 6B (PRIOR ART) EXTRACTION OF THINNING REGION
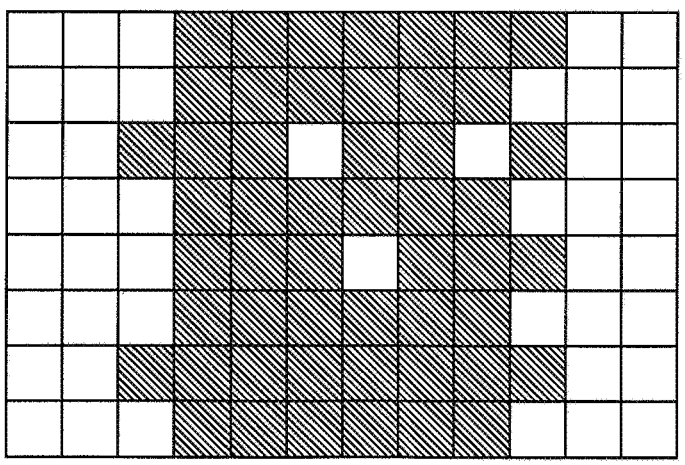
FIG. 6A (PRIOR ART) INPUT IMAGE DATA

INPUT IMAGE DATA

EXTRACTION OF LINE EDGE

EXTRACTION OF BLACK EDGE

EXTRACTION OF
THINNING REGION

EXECUTION OF
THINNING PROCESSING

INPUT IMAGE DATA

EXTRACTION OF LINE EDGE

EXTRACTION OF BLACK EDGE

EXTRACTION OF
THINNING REGION

EXECUTION OF
THINNING PROCESSING

| y | IMAGE DATA | LINE WIDTH COUNTER | EXTRACTION OF THINNING REGION |
|---|---|---|---|
| 0 | | 0 | - |
| 1 | | 0 | - |
| 2 | | 0 | - |
| 3 | | 1 | - |
| 4 | | 2 | - |
| 5 | | 3 | - |
| 6 | | 4 | - |
| 7 | | 5 | - |
| 8 | | 0 | EXECUTION |
| 9 | | 0 | - |
| 10 | | 0 | - |

FIG.10A (PRIOR ART)

| y | IMAGE DATA | LINE WIDTH COUNTER | EXTRACTION OF THINNING REGION |
|---|---|---|---|
| 0 | | 0 | - |
| 1 | | 0 | - |
| 2 | | 1 | - |
| 3 | | 2 | - |
| 4 | | 3 | - |
| 5 | | 4 | - |
| 6 | | 5 | - |
| 7 | | 6 | - |
| 8 | | 7 | - |
| 9 | | 8 | - |
| 10 | | 0 | EXECUTION |
| 11 | | 0 | - |

FIG.10B (PRIOR ART)

| y | IMAGE DATA | LINE WIDTH COUNTER | GRAY WIDTH COUNTER | THINNING REGION WIDTH | THINNING REGION FLAG | EXTRACTION OF THINNING REGION |
|---|---|---|---|---|---|---|
| 0 | | 0 | 0 | 0 | OFF | - |
| 1 | | 0 | 0 | 0 | OFF | - |
| 2 | | 1 | 1 | 0 | OFF | - |
| 3 | | 2 | 0 | 1 | ON | - |
| 4 | | 3 | 0 | 2 | ON | - |
| 5 | | 4 | 1 | 3 | ON | - |
| 6 | | 5 | 2 | 4 | ON | - |
| 7 | | 6 | 0 | 5 | ON | - |
| 8 | | 7 | 1 | 6 | ON | - |
| 9 | | 8 | 2 | 7 | ON | - |
| 10 | | 0 | 0 | 0 | OFF | EXECUTION |
| 11 | | 0 | 0 | 0 | OFF | - |

FIG.11

IMAGE PROCESSING APPARATUS AND IMAGE PROCESSING METHOD

CROSS REFERENCE TO RELATED APPLICATIONS

This application is a continuation of U.S. patent application Ser. No. 13/302,638 filed on Nov. 22, 2011, which claims the benefit of and priority to Japanese Patent Application Nos. 2010-278368, filed Dec. 14, 2010, and 2010-293469, filed Dec. 28, 2010, each of which is hereby incorporated by reference herein in its entirety.

BACKGROUND OF THE INVENTION

Field of the Invention

The present invention relates to an image processing apparatus and an image processing method, for example, to an image processing apparatus and an image processing method for controlling a placement amount of color material.

Description of the Related Art

Presently, image processing apparatuses such as multi function machines and printers for printing image data sent from an input unit such as a host computer or an image scanner are widely used.

In image processing apparatuses using an electrophotographic system, first, a photosensitive drum is evenly charged with a charging roller etc. After that, in accordance with an image signal generated based on the image data, for example, by exposing the photosensitive drum with laser light from a laser scanner, an electrostatic latent image is formed on the photosensitive drum. The formed electrostatic latent image is developed with a developing unit, and the developed toner image is transferred to a material to be transferred by a transfer roller etc. Then, the toner image becomes fixed to the material to be transferred by a fixing unit to thereby enable the image to be printed.

In contrast, when a large amount of adhering toner (that is, the toner placement amount is large) in the development, there may occur such trouble that the toner is not completely fixed and scatters, or the toner drops out in a part having a high dot density. It is known that such trouble occurs with different frequencies according to such environmental conditions as humidity and/or temperature in which the image processing apparatus is placed. Moreover, there are various kinds of media used for printing such as paper, and similar troubles also occur occasionally depending on the kind of the medium.

Furthermore, there has been occurred a problem that, when a straight line is printed in a main scanning direction, the toner scatters to rearward of the line recorded on the material to be transferred in a sub scanning direction (paper feed direction) to thereby deform the image. This is caused by the generation of vapor due to moisture in the material to be transferred by rapid temperature rise when the material to be transferred passes through the fixing unit. This is because, when the toner placement amount is large at this time, the vapor in the material to be transferred is trapped and such phenomenon occurs in which the vapor blows off the toner to rearward of the feed direction. Hereinafter, such phenomenon in which the toner scatters to rearward in the sub scanning direction for the straight line image in the main scanning direction to thereby deform the image is described as a tailing phenomenon.

As a countermeasure against such tailing phenomenon, conventionally, such method is adopted as decreasing the adhesion amount of toner. Specifically, the tailing phenomenon is apt to occur in an image region having specified features. Accordingly, by extracting an image region having such features and performing thinning processing on the image data of the extracted image region, the adhesion amount of toner was able to be decreased with a reduced adverse effect on the image quality (for example, Japanese Patent Laid-Open No. 2004-314308).

In Japanese Patent Laid-Open No. 2004-314308, in order to extract the image region having the specified features, input image data to be a processing object is converted into a binary image, and an edge determination of a solid image region is performed to determine whether or not the image region of a target pixel is an object region of the processing. Furthermore, regarding the extraction of the image region, in Japanese Patent Laid-Open No. 2009-152766, by obtaining the binarization threshold from the density of a peripheral pixel of the target pixel, the image data of the processing object is expanded to a multi-value image.

In contrast, when input data are image data read with an image scanner, the extraction of an effective image region by a conventional edge determination is difficult. This is because, edge parts of image data read with an image scanner do not have straight lines but lines having unevenness. Moreover, since there is variation in density distribution inside the edge, conventional extraction processing of an image region was not able to extract precisely the image region to be a processing object. In Japanese Patent Laid-Open No. 2009-139664, in order to solve these problems, an extract processing of an image region is performed in accordance with the result of the edge determination, and then the thinning processing on the extracted region is performed, when the input data are image data received from the outside such as a host computer. In contrast, by weakening a direct-current component of development bias, development properties are lowered and the adhesion amount of toner is reduced, when the input data is an image data read with an image scanner.

In Japanese Patent Laid-Open No. 2009-152766, in order to convert image data to be a processing object into a multi-value image, the binarization threshold is estimated from the density of peripheral pixels of the target pixel, and, after subjecting the multi-value image to a binarization processing, edge determination processing similar to that for a binary image is performed. However, the calculation of the optimum threshold requires a large processing load, and, in particular, realization of determination processing with a practical processing speed through the use of software is difficult.

In Japanese Patent Laid-Open No. 2009-139664, reduction processing of a toner adhesion amount is changed between image data read with an image scanner and the other image data. However, recently, there is such case where an image read with an image scanner is once sent to a host computer, and the image read with the image scanner is sent from the host computer to an image processing apparatus and is printed. In such a case, although the input image data are image data taken in with an image scanner, the data are image data input from an external device, and thus appropriate extraction processing of the image region was not able to be performed.

SUMMARY OF THE INVENTION

A purpose of the present invention is to provide an image processing apparatus and an image processing method capable of detecting an image region that is an object of thinning processing appropriately and through the use of simple processing.

The image processing apparatus according to the present invention is an image processing apparatus detecting an image region from an input image, including a unit configured to detect a white pixel region being a line having only white dots and extending in the main scanning direction, a unit configured to detect a non-white pixel region being a line having at least one black dot and extending in the main scanning direction, a unit configured to detect a black pixel region being a line having only black dots and extending in the main scanning direction, a unit configured to detect a line region sandwiched by the white pixel regions and including only the non-white pixel region, a unit configured to detect a thinning candidate region being a region sandwiched between the black pixel regions in the line region, and a unit configured to detect a region located at a predetermined distance from the black pixel region located at the front end in the sub scanning direction to rearward of the sub scanning direction in the thinning candidate region and having a predetermined width in the sub scanning direction, as a thinning region.

According to the present invention, it is possible to provide an image processing apparatus and an image processing method capable of detecting an image region that is an object of thinning processing suitably and through the use of simple processing.

Further features of the present invention will become apparent from the following description of exemplary embodiments (with reference to the attached drawings).

BRIEF DESCRIPTION OF THE DRAWINGS

FIGS. 6A to 6C are diagrams explaining the extraction processing and the thinning processing of an image region;

FIGS. 10A and 10B are diagrams showing a line width counter and execution of the processing in the extraction processing of an image region by a related art; and FIG. 11 is a diagram showing the counter and the execution of the processing in the extraction processing of an image region in Example 1 of the invention.

DESCRIPTION OF THE EMBODIMENTS

Hereinafter, the best embodiment for performing the present invention will be explained by using the drawings.

Meanwhile, as the embodiment of the present invention, the case applied to a copier will be explained below, but the present invention is not limited to this, and can be applied to image processing apparatuses of an electrophotographic system such as arbitrary printers or facsimiles, in the range that does not deviate from the purport.

Example 1

Figure 1:
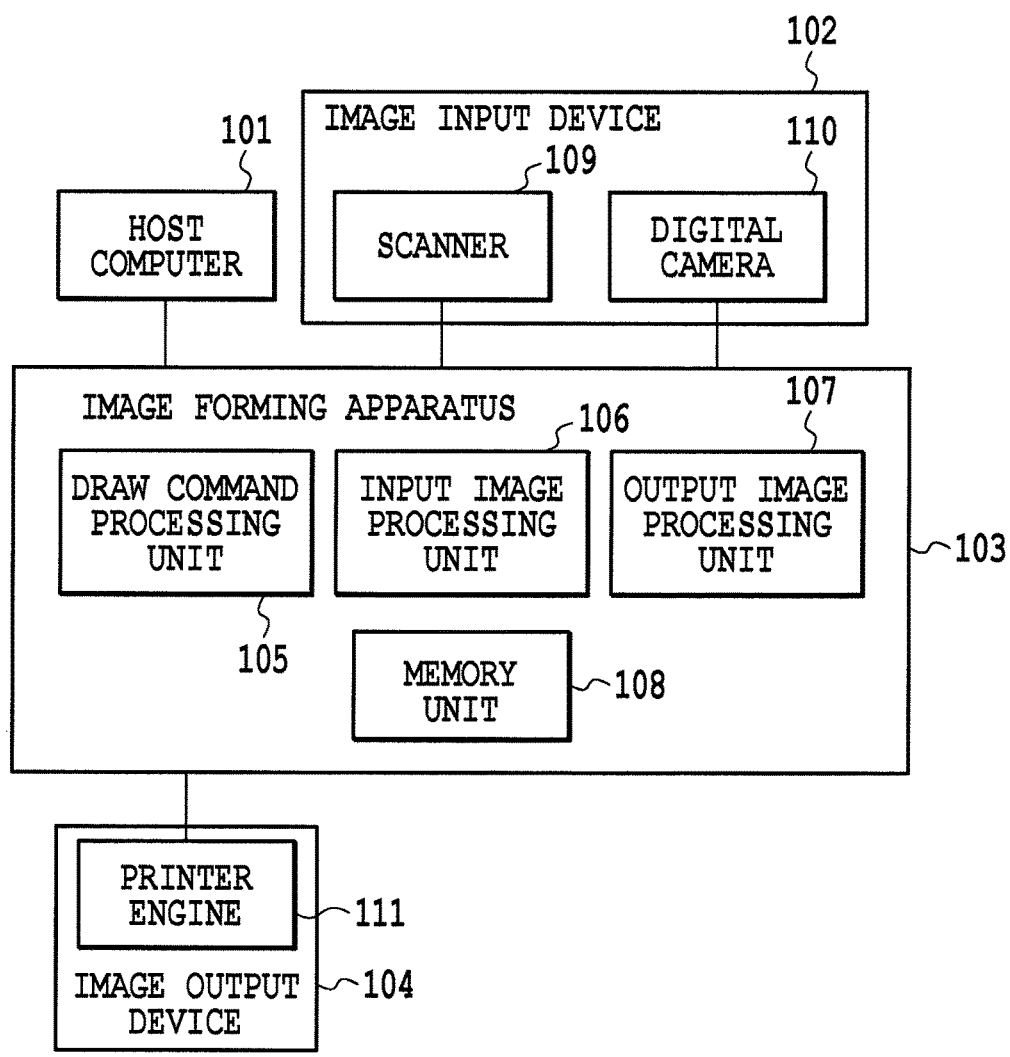
FIG. 1 is a block diagram showing a functional configuration of a copier according to the embodiment.

FIG. 1 is a block diagram showing a functional configuration of the copier in the embodiment. The copier is provided and constituted with an image input device 102, an image forming apparatus 103, and an image output device 104. Hereinafter, processing in which a draw command transmitted from a host computer 101 is received and printed, will be explained by using FIG. 1.

Applications operating on the host computer 101 create page layout documents, word processor documents, graphic documents etc. These digital document data created by applications are transmitted to a printer driver (not shown), and a draw command based on the digital document is created. Meanwhile, digital document data to be sent to the printer driver are not limited to those created by the host computer 101, but may be one created by an application on another computer or a scanner and one stored in the host computer 101. As a draw command generated here is generally a page-description language for creating image data referred to as PDL (Page Description Language). The draw command usually includes a drawing instruction of data such as images, graphics, and texts.

The generated draw command is transmitted to the image forming apparatus 103 connected through a network etc. The image forming apparatus 103 is constituted by including a draw command processing unit 105, an input image processing unit 106, an output image processing unit 107, and a memory unit 108.

The image output device 104 is connected to the image forming apparatus 103, and is provided with a printer engine 111. The printer engine 111 receives image data generated in a predetermined image format from the image forming apparatus 103, and prints the same on paper. Usually, in order to make a stable halftone expression possible in the printer engine, the need to perform low gradation output such as 2-, 4- or 16-gradations arises. Furthermore, generally, the input to the printer engine is image data corresponding to four recording materials of cyan (C), magenta (M), yellow (Y) and black (B). Accordingly, the format of image data input to the printer engine is a low gradation CMYK image of about 2- to 16-gradations.

The draw command processing unit 105 performs analysis processing on the draw command sent from the host computer 101, generates a draw object, and furthermore performs rasterizing processing, to thereby generate a bit-mapped image. Next, in the output image processing unit 107, the generated bit-mapped image is converted into an image format capable of being received by the printer engine. When the bit-mapped image generated here is an RGB image, color data conversion processing is performed, in which color data conversion is performed from RGB to CMYK utilizing a look-up table etc. And, when the bit-mapped image is a multiple gradation image, such image processing as pseudo halftone processing, in which the image is converted into an image of lower gradation by using a dither method etc., is performed in the output image processing unit 107.

The image data thus generated is sent to the image output device 104. The image output device 104 outputs the received image data on paper by the printer engine 111. By the processing explained hereinbefore, the processing of printing the draw command from the host computer 101 is completed.

Next, processing in which a bit-mapped image input from the image input device 102 such as a scanner 109 or a digital camera 110 is printed, will be explained.

The scanner 109 is connected to an image forming apparatus 103, and scans optically an image printed on paper or a film, measures the intensity of reflected light or transmitted light and performs analog-digital conversion to read the bit-mapped image. The digital camera 110 converts the intensity of light to an electric signal with a CCD formed by arranging photodiodes to acquire a shot image as a bit-mapped image. The bit-mapped image obtained here is generally an RGB image.

The bit-mapped image sent from the scanner 109 or the digital camera 110 is converted into a low gradation CMYK image in the input image processing unit 106 and the output image processing unit 107. The image data generated here is transferred to the printer engine 111 and an image is output on paper. By the processing explained hereinbefore, the processing of printing a bit-mapped image input from the image input device 102 such as the scanner 109 is completed.

In contrast, in course of generating the image data described above, in order to reduce the adhesion amount of toner, as necessary, the output image processing unit 107 performs thinning processing on input image data, or image data to be transferred to the printer engine 111. Specifically, the output image processing unit 107 extracts an image region to be an object of the thinning processing from the image data and performs the thinning processing on the extracted image region, with an adjusted thinning amount. Details of the thinning processing will be explained later.

Figure 2:
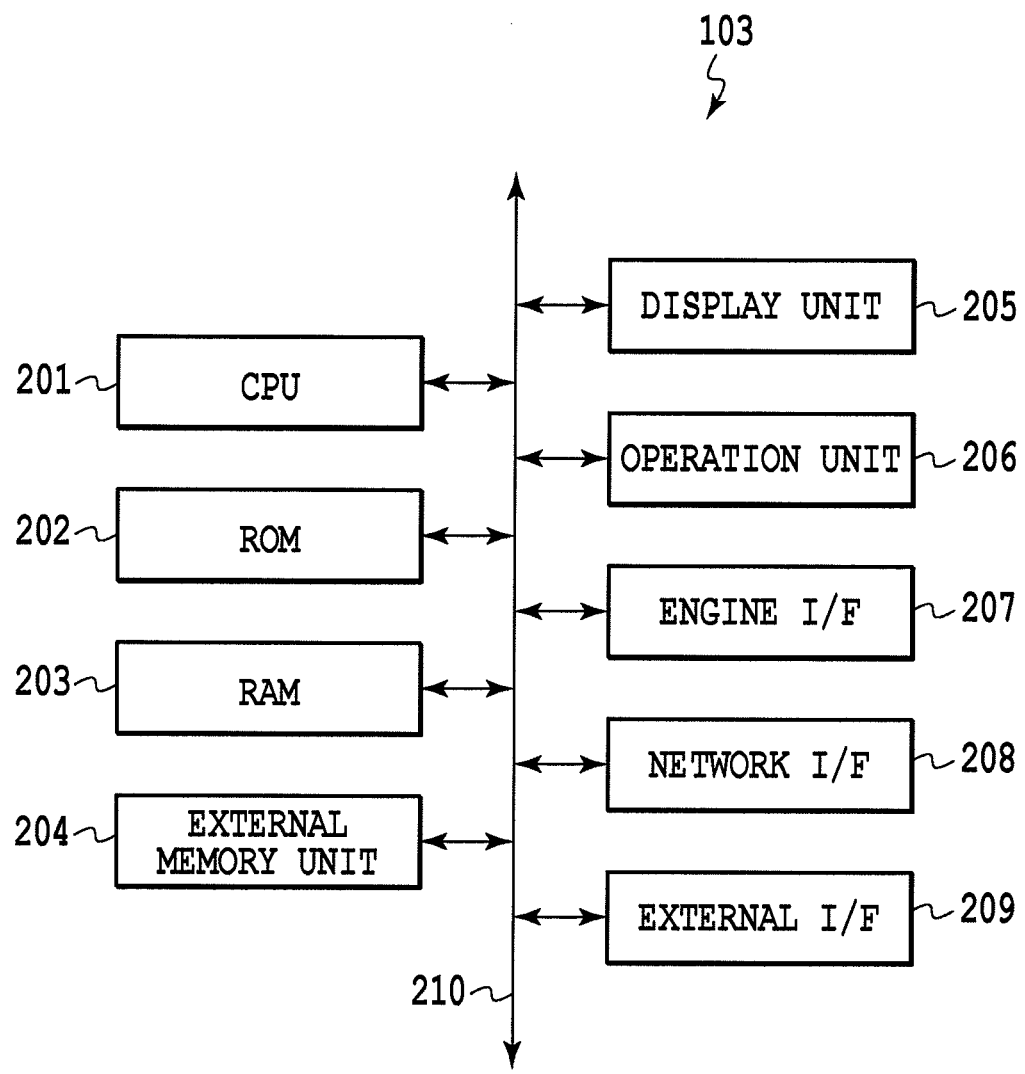
FIG. 2 is a system block diagram showing a configuration of an image forming apparatus in the embodiment.

FIG. 2 is a system block diagram showing the basic configuration of the image forming apparatus 103 in the embodiment. The image forming apparatus 103 is provided with a CPU 201, a ROM 202, a RAM 203, an external memory unit 204, a display unit 205, an operation unit 206, an engine interface 207, a network interface 208, an external interface 209, and a system bus 210.

The details of the above configuration are as follows. The CPU 201 is a central processing unit performing the control of the whole apparatus, arithmetic processing etc., and executes each of processing shown below based on a program stored in the ROM 202. The ROM 202 is a read only memory. The ROM 202 is a storage region of a system start program, a program for controlling the printer engine, and data such as character data, character code information etc. The RAM 203 is a random access memory.

In the RAM 203, font data additionally registered by the downloading is stored, and, to the RAM, a program or data are loaded for every various processing. Furthermore, in the RAM 203, various kinds of programs are expanded to be executed. Furthermore, the RAM 203 can be used as a data storage region of received image data. The external memory unit 204 is constituted, for example, by a hard disk etc. The external memory unit 204 is occasionally used for spooling data, storing a program and respective information files/ image data, and is utilized as a region for operation. The display unit 205 is a unit for performing display, for example, by liquid crystal etc.

The display unit 205 is used for displaying the setting state of the apparatus, and the present processing, error state or the like inside the apparatus. The operation unit 206 is used for performing the change and reset of the setting. The operation unit 206 can display, with the display unit 205, the operation screen at the time of thinning pattern selection processing for the thinning processing, as described later.

The engine interface 207 is an interface inputting/outputting a command or the like for actually controlling the printer engine 111. The network interface 208 is an interface for connecting the image forming apparatus 103 to a network. The image forming apparatus 103 sends/receives image data with the host computer 101 via the network and the network interface 208. The external interface 209 is connected with the scanner 109 or the digital camera 110 being an image input device via an interface of parallel (or serial) etc. The system bus 210 serves as a data path between constituent components.

A processing procedure shown by a flow chart to be described later is stored in any memory unit of the ROM 202, the RAM 203 and the external memory unit 204, and is executed by the CPU 201.

Hereinafter, details of the extraction processing and thinning processing of the image region executed in the output image processing unit 107 will be explained.

Although the occurrence condition of the tailing phenomenon is varied according to image forming apparatuses, it is known that, in an image of 600 dpi, it is particularly apt to occur when the width of the sub scanning direction (a feed direction of paper) of a strait line image in the main scanning direction is 4 dots to 8 dots (150 to 300 micrometers). Moreover, by subjecting an image data to the thinning processing, the height of toner on a recording material can be suppressed. Accordingly, by performing the thinning processing, it is possible to reduce toner at the upper part of the toner to be the cause of the occurrence of the tailing phenomenon, and to reduce the occurrence of the tailing phenomenon.

Figure 3:
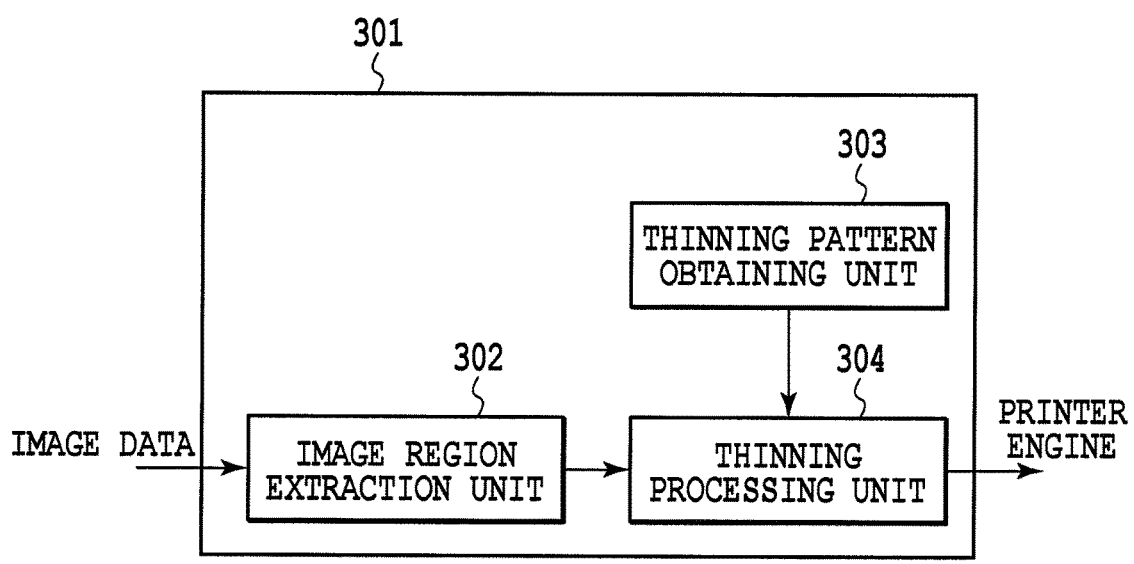
FIG. 3 is a block diagram showing details of an image conversion unit.

FIG. 3 is a block diagram showing details of the image conversion unit 301 performing the extraction processing and the thinning processing of an image region in the output image processing unit 107.

An image region extraction unit 302 performs the extraction of an image region to be subjected to the thinning processing from input image data. As aforementioned, the tailing phenomenon is apt to occur in an image region being a straight line having a specified line width in the sub scanning direction parallel to the feed direction of a material to be transferred and having the main scanning direction perpendicular to the feed direction of the material to be transferred (in the former example, the line width is 4 to 8 dots when a resolving power is 600 dpi). Accordingly, in the image region extraction unit 302, an image region of an image of a straight line in the main scanning direction having a specified width in the sub scanning direction is extracted from input image data. That is, the image region extraction unit 302 extracts an image region where the tailing phenomenon is apt to occur from input image data based on a condition predetermined as a condition under which the tailing phenomenon is apt to occur. Details of the extraction processing of an image region will be described later.

A thinning processing unit 304 performs the thinning processing on the image region extracted in the image region extraction unit 302 by applying the thinning pattern obtained from a thinning pattern obtaining unit 303. Meanwhile, the thinning pattern obtained from the thinning pattern obtaining unit 303 is determined by the selection of a thinning pattern by a user via the display unit 205 and the operation unit 206. The method of determining the thinning pattern obtained from the pattern obtaining unit 303 is not limited to this, but may be set to be performed by any known method.

Hereinafter, about the extraction processing in the image region extraction unit 302, the difference between the processing by an related art and the processing by an Example of the invention will be explained. Here, an example is shown, in which the input image data is binary and, in order to realize a high-speed processing, the processing is performed with 8 dots in the lateral direction as a processing unit.

[Processing by Related Art]

FIGS. 4A to 4D are diagrams explaining the extraction processing and the thinning processing of an image region by a related art.

Figure 4A:
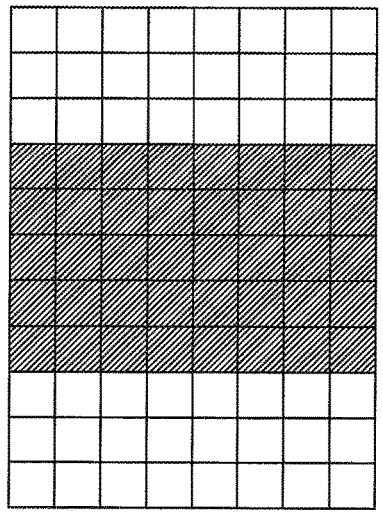
FIGS. 4A to 4D are diagrams explaining the extraction processing and the thinning processing of an image region by a related art.
Figure 4B:
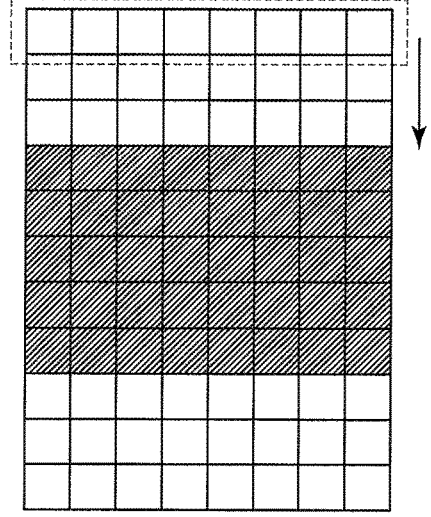
Figure 4C:
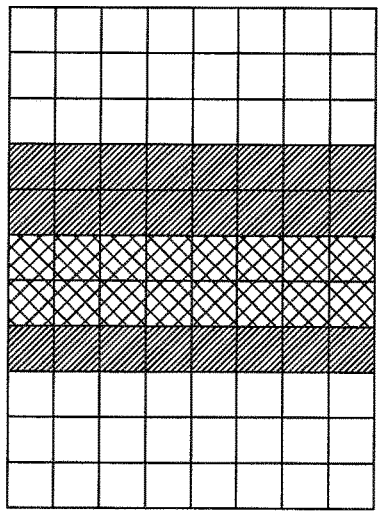
Figure 4D:
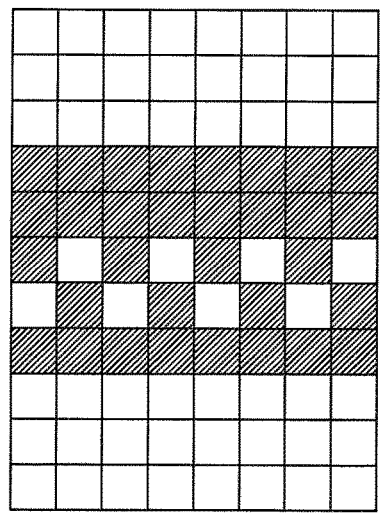

As shown in FIG. 4A, here, an example, in which processing is performed on image data of a line having a 5-dot width in the sub scanning direction as an input, will be explained. Furthermore, as shown in FIG. 4B, here, an example of processing is shown, in which a unit of processing is 8 dots in the lateral direction regarding the extraction processing of an image region for a high-speed processing. By determining image regions sequentially in the sub scanning direction, the horizontal edge is determined and, from the information of the line width on this occasion, image regions to be subjected to the thinning processing are extracted. Here, the horizontal edge being a line of 1-dot width at the front end of the 5-dot width line in the sub scanning direction is not set as an extraction region. A-2 dot width line adjacent to the horizontal edge on the backside in the sub scanning direction is set as the extraction region. Extracted image regions are shown in hatched parts in FIG. 4C. An example in which the thinning processing is applied to an extracted image region is shown in FIG. 4D.

Figure 5:
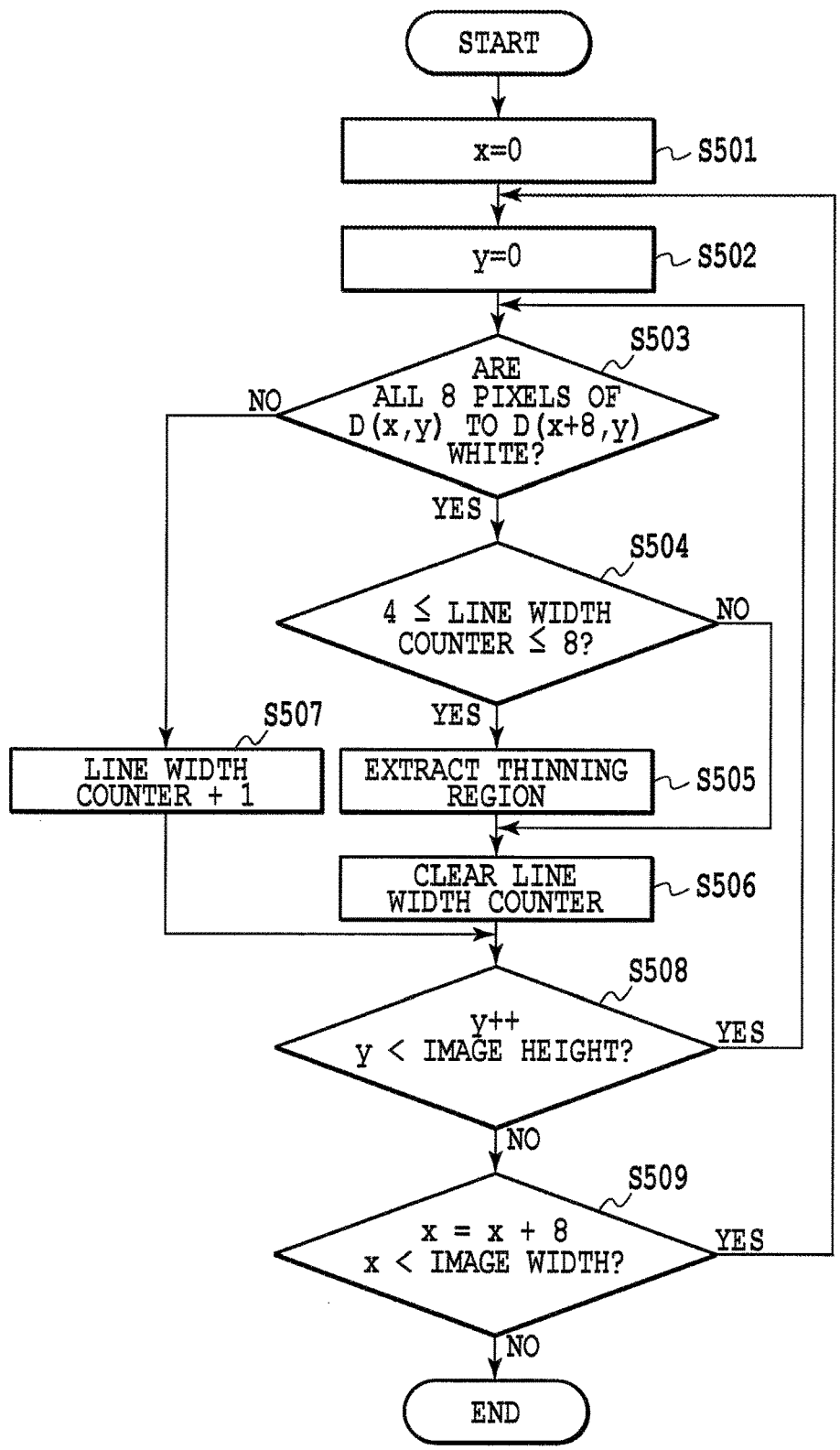
FIG. 5 is a diagram showing a flow of the extraction processing of an image region by a related art.

FIG. 5 shows a flow of the extraction processing of an image region by a related art. Here, each of x and y is the main scanning position and sub scanning position in image data, respectively, and D(x,y) indicates the density of image data at the position (x,y). Meanwhile, in the example, the input image is a binary image, and the concentration is indicated by 1 bit wherein D=1 when toner is printed and D=0 when toner is not printed.

First, image data are sequentially determined (S501, S502). At S503, it is determined whether or not all of 8 dots of an image region being the object to be determined among the input image data are white, that is, D=0 for all dots. Meanwhile, in the example, speeding-up can be achieved by determining 8 dots collectively.

Accordingly, when all of 8 dots are white, since 1 pixel data are of 1 bit, it can be determined whether or not all of 8 dots of the image region that is the object to be determined are white by determining collectively whether 8 dots are 0x00. Here, when all of 8 dots are not white, that is, even only 1 dot is a black dot (S503; No), it is determined that the image region that is the object to be determined is aline region, and a line width counter is counted (S507).

In contrast, when all 8 dots are white (S503; Yes), the line width is determined from the value of the line width counter (S504). Here, when the line width counter shows 4 to 8 dots width in the sub scanning direction in which the tailing phenomenon is apt to occur (S504; Yes), the extraction of a region to be subjected to the thinning processing is performed (S505). In the extraction of the region, as aforementioned, a line of a specified width is left at the edge and inside regions thereof are set to be the extraction region.

In contrast, when there is such line that is thinner than 4 dots or thicker than 8 dots in the sub scanning direction (S504; No), the extraction processing of the region is not performed. By performing the above-mentioned processing for the whole image data (S508, S509), the extraction processing terminates.

Meanwhile, in the flow, when determining sequentially the image data, the determination processing is performed, first, in the sub scanning direction, that is, in the direction in which the counter of y is increased, but the method is not limited to this. Depending on how the image data is retained, the determination processing may be performed sequentially in the sub scanning direction, that is, in the direction in which the counter of x is increased.

FIG. 10A shows the relation between the line width counter and the execution of the processing when a thinning region extraction processing by a related art is performed on image data shown in FIG. 4A according to the flow of processing shown in FIG. 5. The determination is performed sequentially in the sub scanning direction, and, after the line width counter has become 5, the extraction processing of the thinning region of the inside by 1 dot is performed.

In the aforementioned region extraction processing by a related art, when the image data to be the object has an edge of a comparatively straight line as shown in FIGS. 4A to 4D, an effective extraction of an image region to which the thinning processing is applied for reducing the tailing phenomenon has been possible. Examples of such image data include image data obtained by developing printing data sent from a host computer as PDL. However, in the case of image data read by an image scanner, there is a case where the edge part of the line region does not have a straight line.

FIGS. 6A to 6C show diagrams of an example of image data obtained by an image scanner, and of the explanation of an image region extraction processing and a thinning processing for the image data by a related art.

As shown in FIG. 6A, when a horizontal line is read with an image scanner, the edge part thereof does not have a straight line but has unevenness. Moreover, there is a case where noise occurring at the time of the reading, or the like exists inside the line. What indicates extracted regions when performing extraction processing of an image region shown by the flow in FIG. 5 on such an input image data is the hatched portion in FIG. 6B. Furthermore, FIG. 6C shows an example of performing the thinning processing on the extracted image region. It is known that, in FIG. 6C, the interference between unevenness existing at the edge part of the original input image data and the thinning processing brings about the lowering of the image quality.

FIG. 10B shows the relation between the line width counter and the execution of the processing when the thinning region extraction processing is performed on the image data shown in FIG. 6A by a related art.

Excluding the case where all 8 pixels in the main scanning direction are white, the 8 pixels are considered to be a line (S503). Therefore, in the example, after the line width counter has become 8, the extraction processing of a thinning region is to be performed for the inside region by 1 dot. Here, the extraction processing of the thinning region is performed on regions of y=7, 8 shown in FIG. 10B.

Meanwhile, at S503 of the flow in FIG. 5, it is naturally possible to determine that some black dots or more among 8 dots mean a line and other cases mean the foundation region. However, when performing such determination processing based on a threshold value, a remarkable lowering in the processing speed of the region extraction takes place.

[Processing by Example According to the Invention]

Figure 7A:
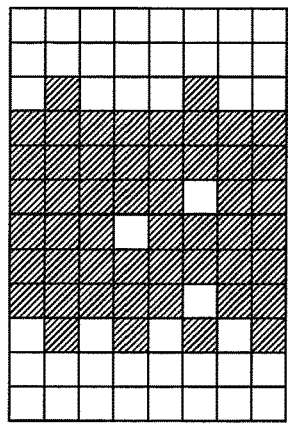
FIGS. 7A to 7E are diagrams explaining the extraction processing and the thinning processing of the image region in Example 1.

FIGS. 7A to 7E are diagrams explaining the extraction processing and the thinning processing of the image region, in an Example according to the invention. The image data shown in FIG. 7A is one obtained by taking in a horizontal line with an image scanner, which is equivalent to that shown in FIG. 6A. For the image data, also in the embodiment, the determination processing of the image region is performed by using 8 dots in the horizontal (main scanning) direction as a processing unit, for realizing speeding-up of the processing. The processing is performed sequentially in the sub scanning direction.

Figure 7B:
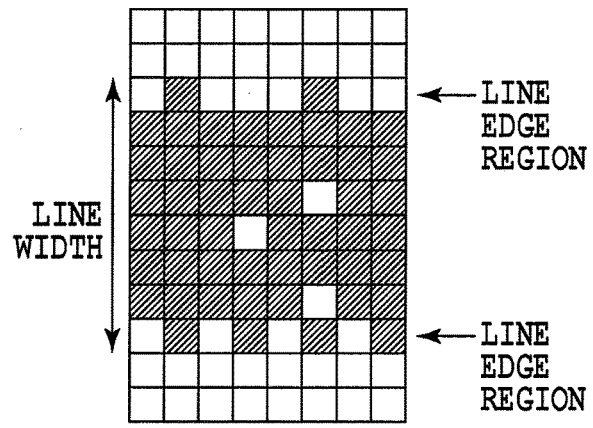
Figure 7C:
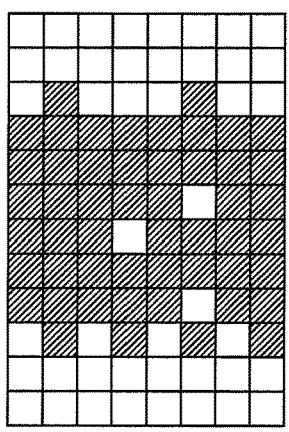

As shown in FIG. 7B, first, a region being the boundary between a region where all object regions to be determined (that is, regions of 8 dots in the main scanning direction) are white (the white pixel region), and a region where all are not white but at least 1 dot is black (the non-white pixel region) and a region extending in the main scanning direction, is detected. A line of 1-dot width in the sub scanning direction being adjacent to the boundary and located in the non-white pixel region is set as a line edge region.

Next, a region in which a region sandwiched between two line edge regions and consisting of a non-white pixel region alone, and the two line edge regions (that is, a region sandwiched between two white pixel regions and consisting of a non-white pixel region alone) are included, is set as a line region. Furthermore, a width of the line region in the sub scanning direction is set as a line width. Each of black pixel regions (a region in which all object regions to be determined are black) closest to each of two line edge regions in the line region is set as a black edge region.

Figure 7D:
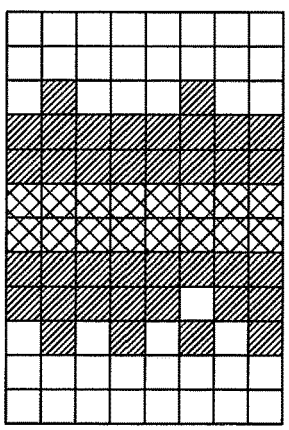

A region sandwiched by two black edge regions in the line region is set as a thinning candidate region. A region starting from a position away from a predetermined distance (1 dot in this example) from a black edge region on the backside in the sub scanning direction to the front side in the sub scanning direction in the thinning candidate region and having a predetermined width (2-dot width in this example) to the front in the sub scanning direction is shown by a hatched region in FIG. 7D. Here, the front in the sub scanning direction means the upper end part of input image data in FIG. 7A, which is an area printed first when printed on paper. Moreover, the backside of the sub scanning direction means the lower edge part of input image data in FIG. 7A, which is an area printed last when printed on paper. The region shown by the hatched part in FIG. 7D is extracted as an image region to be subjected to the thinning processing. That is, among thinning candidate regions sandwiched by two black edge regions, an object image region for the thinning processing having a predetermined width in the sub scanning direction is extracted. In line regions, the scattering of toner is larger on the backside in the sub scanning direction than the front side. Consequently, in the Example, a region having 2-dot width from a position away from 1 dot from a black edge region on the backside in the sub scanning direction to the front side in the sub scanning direction in a thinning candidate region is extracted as a region to be subjected to the thinning processing. However, all regions in the thinning candidate region may be set as the image region to be the object of the thinning processing, or a region on the front side in the sub scanning direction in a thinning candidate region may be set as the image region to be the object of the thinning processing.

Meanwhile, sizes of respective regions such as the width of the unit of processing in the main scanning direction, the width of the black edge region in the sub scanning direction and the width of the image region to be the object of the thinning processing in the sub scanning direction can be set to be an arbitrary size, and are not limited to the sizes described above.

As described above, according to the thinning processing in the embodiment, the determination standard for detecting a line region differs from the determination standard for detecting a thinning region. That is, the line edge region for detecting the line region is the non-white pixel region, and the black edge region for detecting the thinning region is the black pixel region.

Figure 7E:
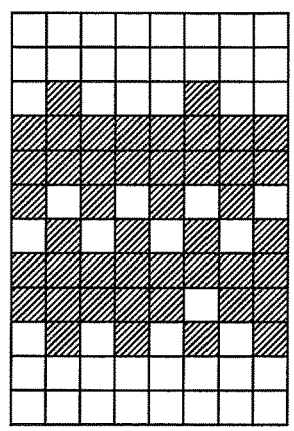

FIG. 7E shows an example of applying the thinning processing to an image region extracted according to the embodiment. Here, the thinning processing refers to processing to change some black dots in the image region to be the object of the thinning processing into white dots. As shown in FIG. 7E, since the determination standard for detecting the line region differs from the determination standard for detecting the thinning region, the interference between unevenness of the edge part as shown in FIG. 6C and the thinning processing does not occur. Consequently, according to the embodiment, while reducing the lowering of the image quality, an object region for the thinning processing can be extracted.

Moreover, according to the embodiment, the determination processing for an object region to be determined (that is, in this example, a region of 8 dots in the main scanning direction) is only the determination processing for either of following regions, that is, either of (1) a region in which all dots are white (a white pixel region), (2) a region in which all dots are black (a black pixel region), and (3) a region of neither the white pixel region nor the black pixel region. Accordingly, since the processing is simple as compared with a case performing the determination processing for an object region to be determined by using a threshold value of a color value, etc., speeding-up of the processing can be achieved.

Figure 8:
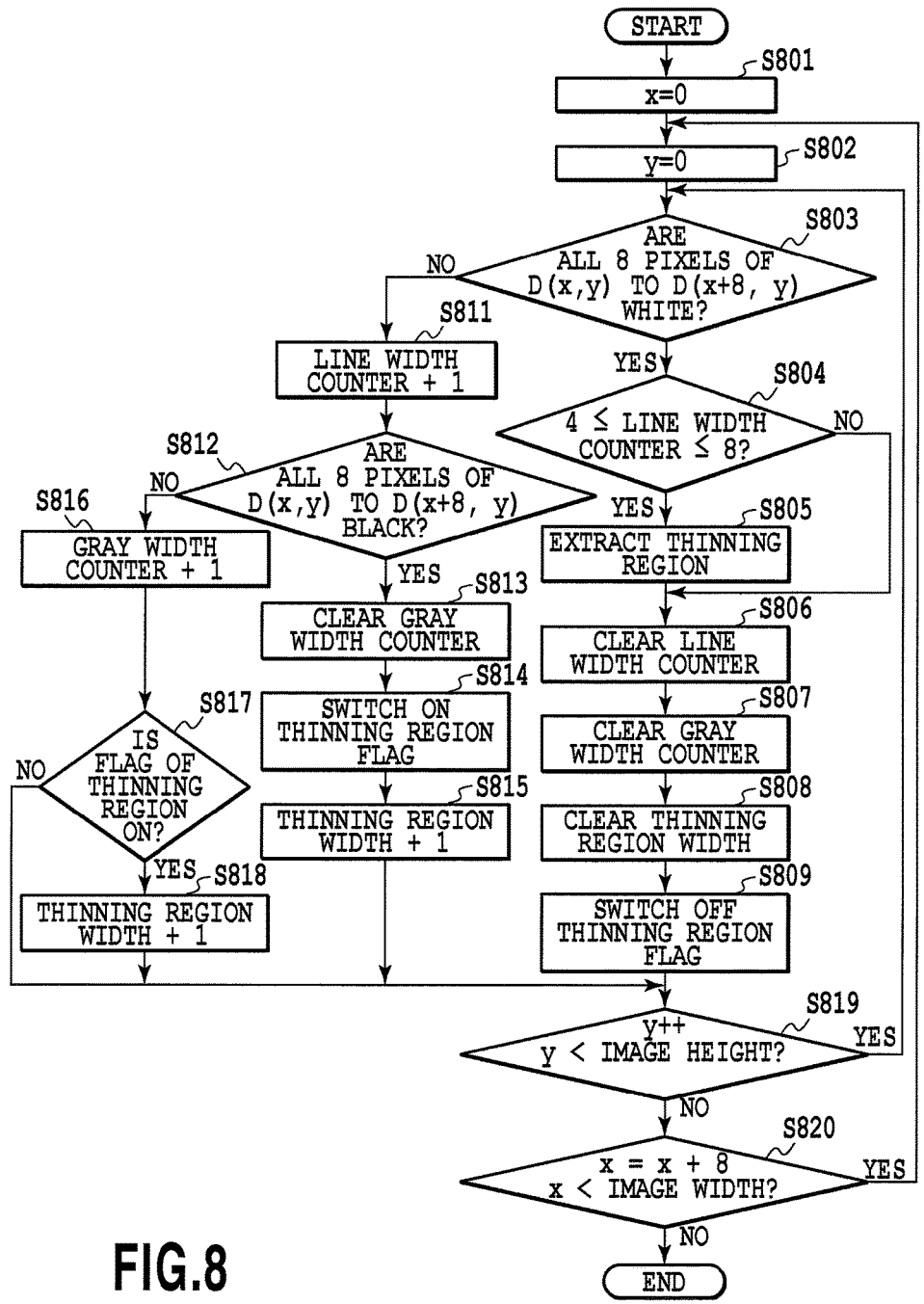
FIG. 8 is a diagram showing the flow of the extraction processing of the image region in Example 1.

FIG. 8 shows a flow of extraction processing of an image region by an Example according to the invention.

Here, also in the same manner as in FIG. 5, each of x, y is the main scanning position and the sub scanning position in image data, respectively, and D(x, y) indicates the density of image data at the position (x, y). Meanwhile, also in the embodiment, the input image is a binary image, and the density is represented by 1 bit wherein D=1 when toner is printed and D=0 when toner is not printed.

First, image data are determined sequentially (S801, S802). At S803, it is determined whether or not an image region that is the object to be determined is a region in which all of 8 dots of the image region that is an object to be determined of input image data are white, that is, all dots have D=0 (the white pixel region). Meanwhile, by determining 8 dots collectively, speeding up can be achieved. Here, when an image region that is the object to be determined is a region in which all of 8 dots are not white, that is, even 1 dot is a black dot (the non-white pixel region) (S803; No), the image region that is the object to be determined is determined to be a line region, and the line width counter is counted (S811). Meanwhile, the line width counter is a counter which counts the width (dot number) in the sub scanning direction of a region in which all determined image regions are the non-white pixel region (the line region). The line width counter starts counting at the moment when the non-white pixel region adjacent to the white pixel region in the sub scanning direction is detected, and counts up every time continuous non-white pixel regions are detected.

Next, it is determined whether or not the image region that is the object to be determined is a region in which all of 8 dots are black, that is, all dots have D=1 (the black pixel region) (S812). Here, when all of 8 dots are black, since image data are of 1 bit, it can be determined whether 8 dots collectively are of 0xFF.

When all 8 dots are black (S812; Yes), a gray width counter is cleared (S813). The gray width counter is a counter which counts numbers of regions that are neither the black pixel region nor the white pixel region and continue in the sub scanning direction.

Furthermore, a flag of the thinning region is placed (S814), and the count-up of the thinning region width is performed (S815). The thinning region flag is a flag switched ON when a black pixel region appearing first in the sub scanning direction in a line region is detected. A thinning region width counter is a counter counting the width (dot number) of a region to be a candidate of an object of thinning processing in the sub scanning direction. The thinning region width counter is a counter which counts the width in the sub scanning direction of a region constituted of the non-white pixel region starting from a black pixel region and continuing in the sub scanning direction, in a line region.

In contrast, when an image region that is an object to be determined is neither a white pixel region nor a black pixel region (S812; No), the count-up of the gray width counter is performed (S816). Further, when the flag of a thinning region has been placed (S817; Yes), a counter of the thinning region width is counted up (S818).

In contrast, when all 8 dots are white (S803; Yes), it is determined whether or not the line width of the line region is a predetermined width from the value of the line width counter (S804). Here, when the line width counter indicates 4- to 8-dot width in the sub scanning direction that is apt to generate the tailing phenomenon (S804; Yes), the extraction of a region to be subjected to the thinning processing is performed by using the count value of the thinning region width and the count value of the gray width (S805). Specifically, first, by subtracting the count value of the gray width from the count value of the thinning region width, the width of a region obtained by adding the black edge region and thinning candidate region surrounded by the black edge region is calculated. Further, by using the value of y when a processing is performed at S805, the count value of the thinning region width and the count value of the gray width, the position of the thinning candidate region is extracted. By subtracting the count value of the thinning region width from the coordinate value of y when a processing is performed at S805, from which position a black edge starts is calculated. Further, by subtracting the gray width count value from the coordinate value of y, the position of a gray region of a line next to the end of the black edge can be calculated. A region obtained by eliminating the black edge region from the region having the calculated width is extracted as a thinning candidate region. In the extracted thinning candidate region, while leaving a line of a specified width adjacent to the black edge, the inside of the line left is to be extracted as a region to be subjected to the thinning processing.

By using the input image data in FIG. 7A, the processing at S805 will specifically be explained. In the case of the input image data in FIG. 7A, the y coordinate value when S805 in FIG. 8 is executed is 10, the count value of the thinning region width is 7, the count value of the gray width is 2, and the width of the region surrounded by the black edge region and the black edge region (the thinning candidate region) is 5 (see FIG. 11). The count value of the gray width and the count value of the thinning region width are cleared at S807 and S808 after the processing at S805. By subtracting the count value 7 of the thinning region width from the coordinate value 10 of y at S805, 3 is calculated, and it is known that the black edge begins from y=3. Further, by subtracting the gray width count 2 from the coordinate value 10 of y at S805, 8 is calculated, and it is known that the gray region including black and white pixels, which is not of a black edge, begins from y=8. As the result, the image data of y=3 to 7 in FIG. 11 is extracted as the black edge region plus the thinning candidate region.

In contrast, when a line is thinner than 4 dots, or a line is thicker than 8 dots in the sub scanning direction (S804; No), the extraction processing of a region is not performed. Further, count values of the line width counter, the gray width counter and the thinning region width are cleared (S806, S807, S808), and the flag of the thinning region is switched OFF (S809). By performing the processing for the whole image (S819, S820), the extraction processing terminates.

As described above, according to the processing shown in FIG. 8, the region to be the object of the thinning processing for reducing the tailing phenomenon can be extracted through the use of simple processing and appropriately. Meanwhile, the detailed processing shown in FIG. 8 is only an example, and, if a region shown by the hatched part in FIG. 7D can be extracted, the extraction may be performed by another processing.

And, here, the example in which the image data read optically by an image scanner are subjected to the extraction processing has been explained. However, as a matter of course, the processing may be performed on other image data such as image data input from an external apparatus.

FIG. 11 shows the relation of the y coordinate (the position in the sub scanning direction), the image data, the line width counter, the gray width counter, the thinning region width counter, the thinning region flag and the execution of the processing, when an extraction processing of an image region by an Example according to the invention is performed on the input image data in FIGS. 6A to 6C.

It is known that, finally, when a white pixel region is detected, a region surrounded by the black edge region can be detected and extracted by using the value obtained by subtracting the gray width counter from the thinning region width counter and the value of the y coordinate.

One feature of the invention lies in the fact that, when a plurality of dots exist with respect to the image region to be the object to be determined, only one point to be determined is whether all are black, all are white, or others. For example, in the case where 8 dots are set to be the unit of processing for an input of a 1 bit binary image, it is sufficient only to determine 0x00, 0xFF, or others. Because of this, the speeding-up of the processing can be expected as compared with a case of calculating an average density or performing processing such as providing a threshold value for the number of black/white dots, on the image region that is the object to be determined. Meanwhile, in the embodiment, 8 dots are exemplified as the unit of processing, but it is needless to say that the unit is not limited to it. For example, in FIG. 7A, the number of dots in a main scanning direction of input image is 8, but the number may be N dots (N is a counting number). Moreover, when applying the extraction processing of the image region shown by the invention to an image data having an edge of a comparatively straight line as shown in FIGS. 4A to 4D, it is possible to extract a region equivalent to that according to a region extraction processing by a related art. Accordingly, without regard to the type of input image data such as printed data by PDL and image data taken in with an image scanner, the application of the processing is possible in the same manner.

As described above, according to Example 1 of the invention, it is possible to realize an image processing apparatus and an image processing method capable of extracting an image region at high-speed and executing the thinning processing based on the determination standard for printed data by PDL even if the input image data is of an image read with an image scanner.

Example 2

In Example 1, the processing example for image data in which the input image is a binary image data are mentioned. In contrast, a technique similar to that in Example 1 can be applied to a region extraction processing of a multi-value image.

FIGS. 9A to 9E are diagrams explaining the extraction processing and the thinning processing of the image region in Example 2. The image data shown in FIGS. 9A to 9E are obtained by taking in a horizontal line with an image scanner, and is a multi-value image unlike in the case of Example 1. Here, an example includes an image data of 2-bit 4-gradations.

Figure 9A:
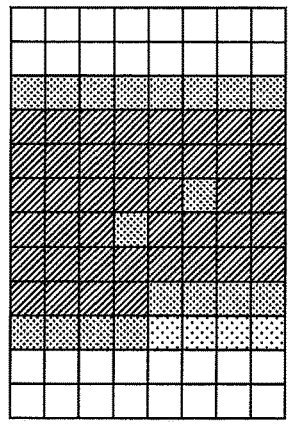
FIGS. 9A to 9E are diagrams explaining the extraction processing and the thinning processing of the image region in Example 2.
Figure 9B:
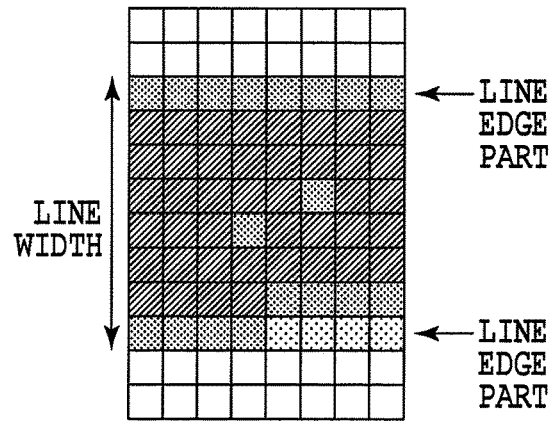
Figure 9C:
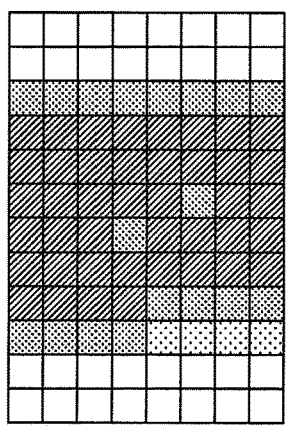

As shown in FIG. 9A, there are densities of four levels. For the image data, also in the embodiment, the processing is performed by setting 8 dots in the horizontal direction as the unit of processing, for realizing the speeding-up of the processing. Image regions are determined sequentially in the sub scanning direction, and as shown in FIG. 9B, first, the boundary of the white pixel region in which all objects region to be determined are white and the non-white pixel region in which all are not white (that is, there is b is set as lack in even only one dot) is detected. A line of 1-dot width in the sub scanning direction being adjacent to the boundary and being located in the non-white pixel region is set as a line edge region.

Next, in an image region sandwiched between two line edge regions, each of black pixel regions (regions in which all object regions to be determined are black) closest to each of the two line edge regions is set as the black edge region.

Figure 9D:
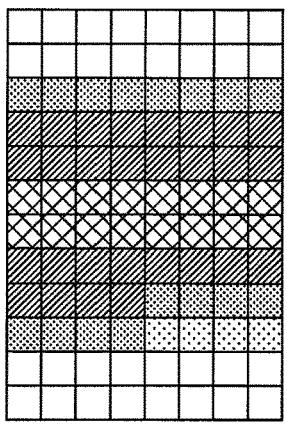
Figure 9E:
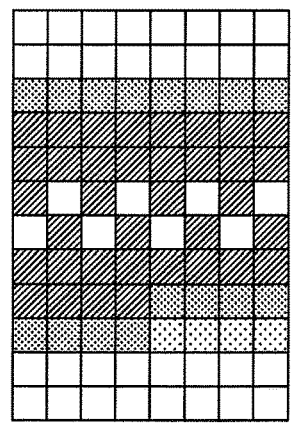

A part sandwiched between line edge regions is set as the line region, and the width of the line region in the sub scanning direction is set as the line width. A region present in the line region and sandwiched between black edge regions is set as the thinning candidate region. From the thinning candidate region, a portion shown as the hatched part in FIG. 9D is extracted as an image region to be subjected to the thinning processing. FIG. 9E shows an example of applying the thinning processing to the extracted image region.

One of features of the invention lies in the fact that, even when an input image is of multi-value image data, for an image region that is the object to be determined including a plurality of dots, only a determination is made whether all are black, all are white, or others. For example, when 8 dots are set to be the unit of processing for input image data of 2-bit 4-gradations, it is sufficient only to determine whether 0x0000, 0xFFFF, or others. Because of this, the speeding-up of the processing can be expected as compared with a case of calculating an average density or performing processing such as providing a threshold value for the gray level, on the image region that is the object to be determined.

Meanwhile, although with respect to the multi-value image to be input, in the Example, an image before performing pseudo halftone processing is used as an example, the application to an image data after performing pseudo halftone processing based on multiple values is also naturally possible. Moreover, when the application in the case of the multi-value image is assumed, execution of an edge enhancement processing (for example, a filter processing etc.) as preprocessing of the extraction processing of the invention makes it possible to extract a region more effective for performing the thinning processing.

As described above, according to Example 2 of the invention, even when input image data are of a multi-value image, it is possible to provide an image processing apparatus and system capable of extracting an image region at high speed and performing the thinning processing based on the determination standard similar to that for a binary image.

OTHER EMBODIMENTS

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus comprising:
a memory storing instructions; and
one or more processors which execute the instructions and cause the image processing apparatus to function as:
a first edge detecting unit configured to detect two first edges of a line region included in image data, each first edge extending in a main scanning direction, including at least one pixel having a density greater than a predetermined density, and being adjacent to a white pixel region, the image data consisting of N pixels in the main scanning direction and M pixels in a sub scanning direction, wherein N and M are integers;
a second edge detecting unit configured to detect two second edges which are sandwiched between the first two edges and have a density greater than the predetermined density included in the line region, each second edge extending in the main scanning direction, consisting of pixels having a density greater than the predetermined density, and being closest to the corresponding one of the two first edges; and
a processing unit configured to decrease a density of at least one pixel having a density greater than the predetermined density within a target region sandwiched between the two second edges in the line region,
wherein the density decreasing is not performed for the at least one pixel which has a density greater than the predetermined density and is in the line region, in a case where the at least one pixel is in a region other than the target region.

2. The image processing apparatus according to claim 1, wherein the image data is binary image data.

3. The image processing apparatus according to claim 1, wherein the image data is multi-value image data.

4. The image processing apparatus according to claim 1, wherein the image data is image data read by an image scanner.

5. The image processing apparatus according to claim 1, wherein the decrease in the density includes replacement of the at least one pixel having a density greater than a predetermined density in the target region.

6. An image processing method comprising:
- detecting two first edges of a line region included in image data, each first edge extending in a main scanning direction, including at least one pixel having a density greater than a predetermined density, and being adjacent to a white pixel region, the image data consisting of N pixels in the main scanning direction and M pixels in a sub scanning direction, wherein N and M are integers;
- detecting two second edges which are sandwiched between the first two edges and have a density greater than the predetermined density included in the line region, each second edge extending in the main scanning direction, consisting of pixels having a density greater than the predetermined density, and being closest to the corresponding one of the two first edges; and
- decreasing a density of at least one pixel having a density greater than the predetermined density within a target region sandwiched between the two second edges in the line region,
- wherein the density decreasing is not performed for the at least one pixel which has a density greater than the predetermined density and is in the line region, in a case where the at least one pixel is in a region other than the target region.

7. A non-transitory computer readable storage medium storing a program that, when executed by a computer, causes the computer to perform a method comprising:
- detecting two first edges of a line region included in image data, each first edge extending in a main scanning direction, including at least one pixel having a density greater than a predetermined density, and being adjacent to a white pixel region, the image data consisting of N pixels in the main scanning direction and M pixels in a sub scanning direction, wherein N and M are integers;
- detecting two second edges which are sandwiched between the first two edges and have a density greater than the predetermined density included in the line region, each second edge extending in the main scanning direction, consisting of pixels having a density greater than the predetermined density, and being closest to the corresponding one of the two first edges; and
- decreasing a density of at least one pixel having a density greater than the predetermined density within a target region sandwiched between the two second edges in the line region,
- wherein the density decreasing is not performed for the at least one pixel which has a density greater than the predetermined density and is in the line region, in a case where the at least one pixel is in a region other than the target region.

8. The image processing apparatus according to claim 1, wherein the pixel having the density greater than a predetermined density is a black pixel.

* * * * *